Figure 1:
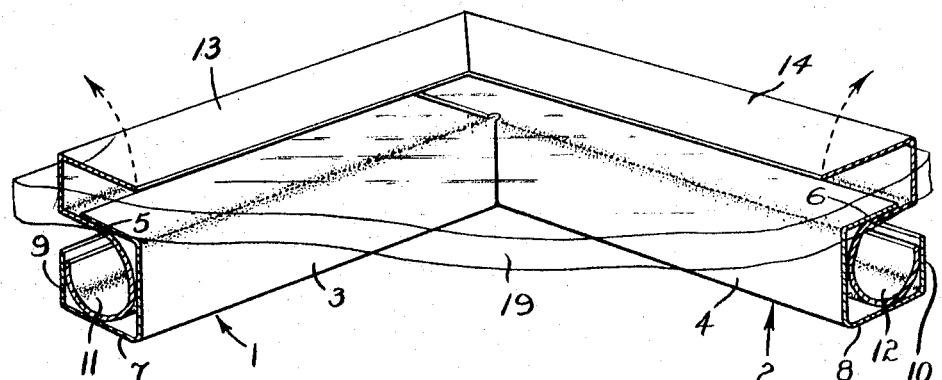

Nov. 28, 1967 A. A. PHILPOT 3,355,204
INTERLOCKING JOINTS FOR PANEL FRAMES
Filed July 15, 1964 2 Sheets-Sheet 1

United States Patent Office 3,355,204
Patented Nov. 28, 1967

3,355,204
INTERLOCKING JOINTS FOR PANEL FRAMES
Arthur A. Philpot, 37 Northumberland St.,
Tusmore, South Australia, Australia
Filed July 15, 1964, Ser. No. 382,723
3 Claims. (Cl. 287—189.36)

This invention relates to an interlocking joint for a frame for panels, and more particularly to window, door and other building frames of the type which comprise metal members formed to a constant section for most of their length being joined at the corners.

It is well-known that the most difficult and expensive single operation in the manufacture of a window frame is the joining of the corners or the making of T joints. When the frame is made from metal this is usually effected by means of a somewhat complicated weld, and even when the welding is achieved by the flash-butt process on the mitre, the value of the equipment used is high and the labour in cleaning the weld from the joint, which is seldom satisfactory, is considerable.

In many cases, not only must the weld be cleaned from the joint, but considerable grinding is required because of the need to retain the outer flange in a flat plane when this type of joint is used.

The main object of this invention is to provide improved means whereby the corners of a metal window frame may be joined in the assembly of the glass.

In its simplest form this invention achieves its objects by providing an interlocking joint for a frame wherein a pair of adjoining frame members comprising the joint are formed of sheet metal and each has in its cross-sectional shape sides forming a channel with a narrow mouth, a first member having an outwardly projecting tab at one end, the second member having a slot at one end, whereby the two ends may be joined to form a corner of the frame with the tab of the first member lying against an inner surface of a wall of the second member, and first and second locking members releasably retained in the said first and second frame members respectively, each locking member having in its cross-sectional shape a part circular portion within the frame member and each being rotatable therein to engage frictionally the inner surfaces of the walls thereof and the second locking member additionally engaging frictionally said tab against said inner surface of the second member upon rotation.

It will immediately be apparent that the configuration of the frame member ends accommodated in the ends of other adjacent frame members can vary widely, and can for example include notched portions for a positive interlock at the corner joints or contiguous tabs retained together frictionally by the locking members. Quite clearly, positive interlocked corners can retain the frame in assembled condition.

Figure 2:
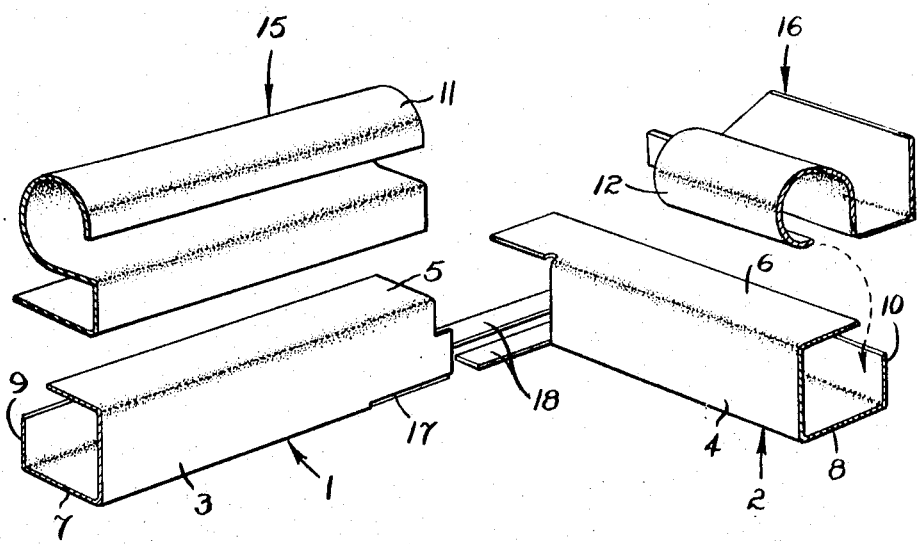
Figure 3:
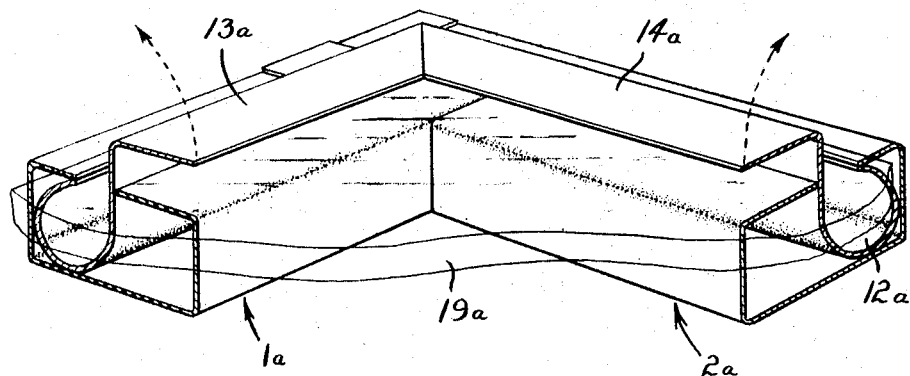
Figure 4:
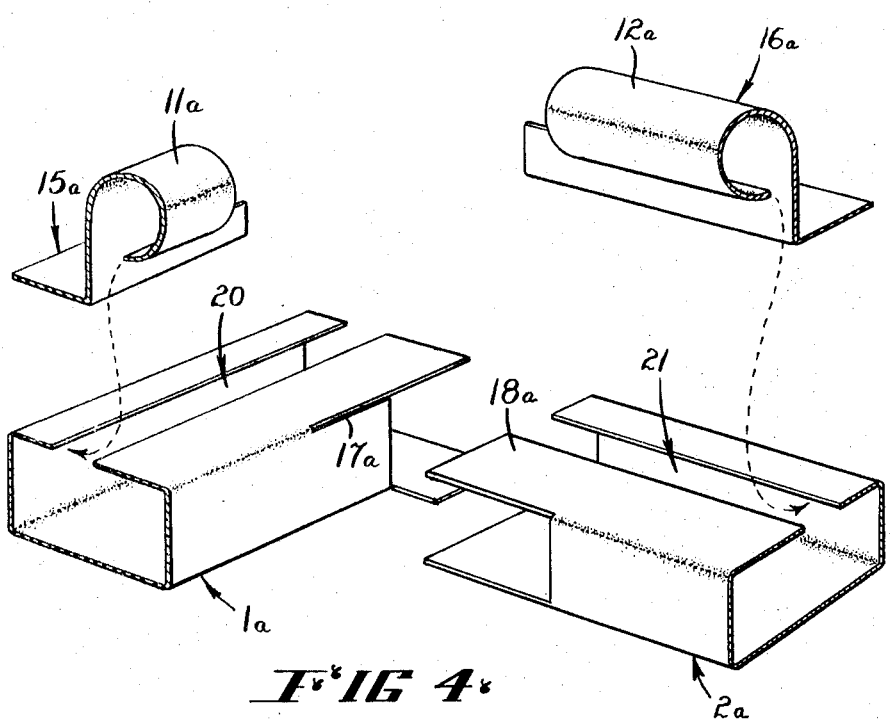

Embodiments of both these types of corner joints are described hereunder with reference to, and are illustrated in the accompanying drawings, in which:

FIG. 1 illustrates a frame corner joint in accordance with a preferred embodiment of the present invention, FIG. 2 shows the elements of FIG. 1 in an "exploded" view, FIG. 3 shows a further interlock corner joint in accordance with another embodiment of the present invention, and FIG. 4 shows the elements of FIG. 3 in an "exploded" view.

According to the embodiment illustrated in FIGS. 1 and 2 of the drawings, the channel members 1 and 2 are made from sheet metal folded to have in each case two adjacent sides 7, 8 and 3, 4 of full width and two adjacent sides 5, 9 and 6, 10 of part width forming a narrow mouth between the edges of the part width sides, the mouth being disposed along a corner of the channel defined by the sides. At the end of the member 2, an incision is made in the full width side 4 and the other full width side 8 is folded outwardly to form an outwardly extending tab 18 (shown bifurcated in FIG. 2) of width equal to the spacing within the channel of the member 1. A slot 17 is cut in the end of the complementary member 1 and when the tab 18 is positioned into the end of the channel, the slot 17 in the member 1, the width of which is equal to metal thickness, engages over the full width side 8 of the member 2 in alignment with the outstanding tab 18.

The locking members 15 and 16 are insertable in the channels of the members 1 and 2, and each locking member is formed of sheet metal but shaped in cross-section somewhat similar to a number 5, the part circular portions 11 and 12 engaging at four points when the glass retaining ledge 13, 14 respectively, of locking members 15, 16 are disposed parallel to the glass retaining sides 5 and 6 on the members 1, 2 (see FIG. 1). It is found that by using even a light gauge metal there is considerable friction between the locking members and the insides of the channels, and in some cases its friction is sufficient to retain the locking members without further locking means. Further locking means however are readily insertable, and they need only comprise a pin, a self-tapping screw or the like. The material can conveniently be galvanised iron, stainless steel, or a cuprous material. The cost of a sheet metal frame will be seen to be very small. FIG. 1 shows a sheet of glass 19 fitted into the assembled joint.

As said, this invention may take various forms, and a further embodiment is shown in FIGS. 3 and 4, which is substantially similar to that of FIGS. 1 and 2, and similar parts are similarly numbered.

In this embodiment, however, the frame members 1a and 2a are arranged to define channels of rectangular shape, with narrow mouths 20 and 21 extending along one of the wider faces in each instance.

It will be seen that other embodiments can be used such as by making use of sliding members or alternatively screw members, or by making use of members which simply are screwed into position instead of being pushed into position by hand.

The rotation of the locking members can be prevented by screws if this is desired to obtain a rigid frame, or wedges may be used for this purpose if that is desired.

The rotatable members may be formed with an inwardly disposed angle section occupying one quadrant, the remaining three quadrants being either circumferential or angled, the inwardly disposed angle portion enabling the members to be readily inserted into the frame sections but to be locked therein when the glass retaining ledge engages the edge of the glass.

It will be seen that many advantages are obtained by the use of this invention.

The channel sections comprising the sides of the frame are arranged to drain away water, and are themselves made from continuous constant section strip. This means that the production of these parts is greatly simplified, and it will be realised that the ends in being cut off can also be shaped so as to interlock in the manner described above.

A frame may be built into a brick wall as the bricks are being laid, thereby reducing costs, and the glass retaining members may be inserted into the sections after erection if this is desired.

When the frame is formed of larger sections than for say a window frame, it can be used as a load bearing member, particularly if constructed of say closed box section. Panels between such frames then have allowance for thermal expansion, and in such a case the panel retaining members may be spring loaded in the frame.

In all cases, it will be seen that a T joint may be made in substantially the same way as a corner joint.

What I claim is:

1. An interlocking joint for a frame wherein a pair of adjoining frame members comprising the joint are formed of sheet metal and each has in its cross-sectional shape sides forming a channel with a narrow mouth, a first member having an outwardly projecting tab at one end, the second member having a slot at one end, whereby the two ends are joined to form a corner of the frame with the tab of the first member lying against an inner surface of a wall of the second member, and first and second locking members releasably retained in the said first and second frame members respectively, each locking member having in its cross-sectional shape a part circular portion located within its respective frame member and each being rotatable therein to engage frictionally the inner surfaces of the walls thereof and the second locking member additionally engaging frictionally said tab against said inner surface of the second member upon rotation.

2. An interlocking joint for a frame wherein a pair of adjoining frame members comprising the joint are formed of sheet metal and each has in its cross-sectional shape sides forming a channel with a narrow mouth, a first member having an outwardly projecting tab at one end, the second member having a slot along a corner at one end, whereby the two ends are joined to form a corner of the frame with the tab of the first member lying against an inner surface of a wall of the second member, and first and second locking members releasably retained in the said first and second frame members respectively, each locking member being of cross-sectional shape similar to a numeral 5 with its part circular portion located within its respective frame member and each being rotatable therein to engage frictionally the inner surfaces of the walls thereof and the second locking member additionally engaging frictionally said tab against said inner surface of the second member upon rotation, and the flange of each locking member defining with an outer surface of a respective frame member a panel retaining recess.

3. An interlocking joint for a frame wherein a pair of adjoining frame members comprising the joint are formed of sheet metal and each has in its cross-sectional shape two sides of full width and two adjacent sides of part width, said sides forming a channel with a narrow mouth between the edges of the part width sides, a first member having a full width side folded outwardly at one end to form an outwardly projecting tab, the second member having a slot along a corner at one end, whereby the two ends are joined to form a corner of the frame with the tab of the first member lying against an inner surface of a wall of the second member, and first and second locking members releasably retained in the said first and second frame members respectively, each locking member being of cross-sectional shape similar to a numeral 5 with its part circular portion located within its respective frame member and each being rotatable therein to engage frictionally the inner surfaces of the walls thereof and the second locking member additionally engaging frictionally said tab against said inner surface of the second member upon rotation, and the flange of each locking member defining with an outer surface of a part width side of a respective frame member a panel retaining recess.

References Cited

UNITED STATES PATENTS

| 1,512,569 | 10/1924 | Anderson | 189—36 |
| 1,994,022 | 3/1935 | Huff | 189—36 |

FOREIGN PATENTS

| 961,216 | 6/1964 | Great Britain. |

DAVID J. WILLIAMOWSKY, *Primary Examiner.*

P. C. KANNAN, *Assistant Examiner.*